United States Patent [19]

Lanneau et al.

[11] 4,345,887

[45] Aug. 24, 1982

[54] DEVICE FOR THE POURING OF PLASTER

[75] Inventors: Jacques Lanneau, Breuil-le-Vert; Adrien Delcoigne, Chantilly, both of France

[73] Assignee: Isover Saint-Gobain, Neuilly, France

[21] Appl. No.: 180,036

[22] Filed: Aug. 21, 1980

[30] Foreign Application Priority Data

Aug. 21, 1979 [FR] France ............................... 79 21038

[51] Int. Cl.³ ........................ B28B 21/56; B28B 21/94; B29C 13/00; B29D 7/02

[52] U.S. Cl. .................................... 425/115; 156/500; 366/150; 425/122; 425/224; 425/230; 425/231; 425/373; 425/447

[58] Field of Search ........................... 156/39, 42, 500; 222/415, 148; 366/69, 150; 198/497, 498, 499; 118/413, 414, 415; 425/115, 122, 126 R, 224, 373, 447, 461, 471, 4 C, 817 C, 110, 127, 225, 226, 230, 231; 164/89, 429

[56] References Cited

U.S. PATENT DOCUMENTS

| | | | |
|---|---|---|---|
| 1,036,125 | 8/1912 | King | 198/499 |
| 1,489,693 | 4/1924 | Brookby | 156/39 |
| 1,719,199 | 7/1929 | Schumacher | 156/500 |
| 2,393,213 | 1/1946 | Willard | 164/429 |
| 3,109,763 | 11/1963 | Finger | 425/115 |
| 3,167,603 | 1/1965 | Lillie | 425/817 C |
| 3,235,400 | 2/1966 | Voelker | 118/415 |
| 3,276,072 | 10/1966 | Politzer et al. | 425/871 C |
| 3,288,275 | 11/1966 | Bunting | 198/498 |
| 3,462,795 | 8/1969 | Hermanns | 425/115 |
| 3,532,576 | 10/1970 | Proctor et al. | 425/115 |
| 3,541,639 | 11/1970 | Enicks | 425/115 |
| 3,697,205 | 10/1972 | Ross et al. | 425/4 C |
| 3,773,452 | 11/1973 | Taga | 425/115 |
| 3,832,099 | 8/1974 | Berg | 425/4 C |
| 3,832,250 | 8/1974 | Pearson | 156/39 |
| 3,833,693 | 9/1974 | Ross | 425/447 |
| 3,867,494 | 2/1975 | Rood et al. | 425/4 C |
| 3,870,441 | 3/1975 | Petzakis | 425/817 C |
| 3,894,826 | 7/1975 | Kato | 425/817 C |
| 4,067,672 | 1/1978 | Korpela et al. | 425/4 C |

FOREIGN PATENT DOCUMENTS

| | | | |
|---|---|---|---|
| 656846 | 9/1951 | United Kingdom | 425/115 |

*Primary Examiner*—Willard E. Hoag

*Attorney, Agent, or Firm*—Harding, Earley, Follmer & Frailey

[57] ABSTRACT

The present invention concerns the manufacture of objects made of plaster, essentially in the form of boards and, specifically, the pouring onto a moving conveyor of a mixture of plaster and water into a reservoir with an open bottom installed on top of said conveyor.

It proposes to integrate the upstream rear wall of the reservoir within a surface of greater dimensions than the rear wall, and displacing said continuously, with the purpose of presenting a different portion of the surface as the upstream rear wall.

The invention allows continuous cleaning of the upstream rear wall without disturbing the pouring process.

18 Claims, 8 Drawing Figures

DEVICE FOR THE POURING OF PLASTER

TECHNICAL FIELD

The present invention concerns the manufacture of objects made of plaster, essentially in the form of boards and, specifically, the pouring onto a moving conveyor of a mixture of plaster and water into a reservoir with an open bottom installed on top of said conveyor.

CROSS-REFERENCES TO OTHER APPLICATIONS

This patent application is related to our copending applications, the disclosures of which are incorporated by reference, U.S. patent applications Ser. No. 3,415, Ser. No. 3,416, and Ser. No. 3,414, all filed on Jan. 15, 1979, and Ser. No. 118,099, filed on Feb. 4, 1980. Application Ser. No. 3416 is now U.S. Pat. No. 4,257,710.

BACKGROUND OF PRIOR ART

From our French patent application No. 7803475, U.S. patent application Ser. No. 3,414 filed Jan. 15, 1979, now U.S. Pat. No. 4,288,263 it is known that the reservoir front and rear walls are made from plates and that the side walls consist of lateral moving bands which move with the conveyor and which bear against the side edges of the front and rear plates. The reservoir is fed through nozzles which pass through the front plate, discharging into the reservoir and produce nearly horizontal mixing streams, oriented in the opposite direction from the direction of advance of the conveyor. The front plate is slightly raised so as to form a pouring slot between its lower edge and the conveyor. In order to prevent massive setting within the product contained in the reservoir and on the walls of said reservoir, the mixture is introduced through the feed nozzles at a given rate, fast enough to provide stirring inside the reservoir, and the front and rear plates are caused to vibrate with the help of vibrators mounted on these plates. When reinforcements are placed inside the product manufactured, under certain circumstances these reinforcements are introduced in such a way that they rub against one and/or the other of the front and rear plates of the reservoir, or at least against their lower edges. To the extent that the height of the feed nozzles, the flow rate of the mixture, and the spacing between the front and rear plates of the reservoir, are set to correspond to the description in the aforementioned patent application U.S. Ser. No. 3,414, submerged streams cause stir lines which are visible on the surface, and these stir lines follow at least a trajectory from the front plate to the rear plate, and a return flow to the front plate, forming interlocking loops covering the whole surface of the reservoir, to the extent, that the front and rear plates are vibrated, deposits do not form which may entail massive setting, and the pouring device (henceforth called the pouring head) functions without assistance. However, if the pouring head is not adjusted precisely, splashing takes place and deposits may form, especially upon the rear plate, near the surface above the mixture, especially between the stir loops and in the corners of the reservoir. These deposits require occasional cleaning without nevertheless requiring the pouring to be stopped, the more frequently the worse the adjustment, for example, every two to three hours.

The pouring heads, even with the inconvenience of careful adjustment of the inconvenience of periodical cleaning of the rear plate, function satisfactorily up to a width of about sixty centimeters. But as the dimensions increase, the main problem becomes how to maintain the plates vibrating, especially the rear plate upon which the deposits principally form.

BRIEF SUMMARY OF THE INVENTION

To overcome these problems, we propose to renew the surface of the rear wall, preferably in a continuous fashion, without disturbing the pouring and stirring. One solution is to integrate the rear wall within a larger surface that is moved intermittently or continuously in order to present to the reservoir a rear wall with a different surface portion. In one implementation, this surface consists of a flat plate which on one side faces the pouring reservoir. In other designs, the surface is curved and is rotated to face the reservoir with a different portion. The portion put out of service is cleaned in anticipation of its next exposure to the reservoir to play anew its role of rear wall. This curved surface could be a rotating drum with a vertical axis, with either a diameter equal to the width of the conveyor, bearing on the lateral strips in the course of their trajectory, or having a larger diameter thus bearing only on the extremities of the lateral strips. In the prior state of the art, it was also considered to reinforce the fabricated products and it was proposed to introduce a reinforcement upstream of the reservoir and under said reservoir, guided by a reinforcement inserter having the shape of either a curved flap or of a rounded bolster. This reinforcement inserter is attached to the base of the rear plate of the reservoir, or is independent, in which case it is fastened upstream from the reservoir.

In a preferred form of the invention, the operations of renewal of the rear plate, cleaning of the rear plate, and guiding the reinforcement are combined by designing the curved surface, of which the rear plate is a portion, as a cylindrical roller with a horizontal axis at right angles to the direction of advance of the conveyor, and of the width of said conveyor. This cylinder is driven in rotation; the reinforcement to be placed inside the poured product is inserted and bears on the lower part of the cylinder and rubs on it and thus cleans it. Preferably, the cylinder is driven in a rotation in the opposite direction from the direction of movement of the reinforcement driven by the poured product. The speed of rotation of the roller or, in some instances, the frequency, and the angle of rotation when the rotation is discontinuous, are such that a point of the roller surface in contact with the liquid mixture of plaster and water is taken out of contact with the mixture and cleaned in such time that any plaster deposited on that point does not have the time to set.

In addition, to the extent that a reinforcement may be introduced into the reservoir, the front plate is given a convex shape with a horizontal axis of convexity and at right angles to the direction of movement of the conveyor and the reinforcement is inserted bearing on the convex surface. Advantageously, the new product feed tubes are then independent of the front plate. Feeding is done through a feed ramp, located between the front and rear plates but as near to the front plate as possible.

BRIEF DESCRIPTION OF THE DRAWINGS

The invention shall now be described in more detail with regards to the drawings that represent it.

DETAILED DESCRIPTION OF THE INVENTION

Figure 1:
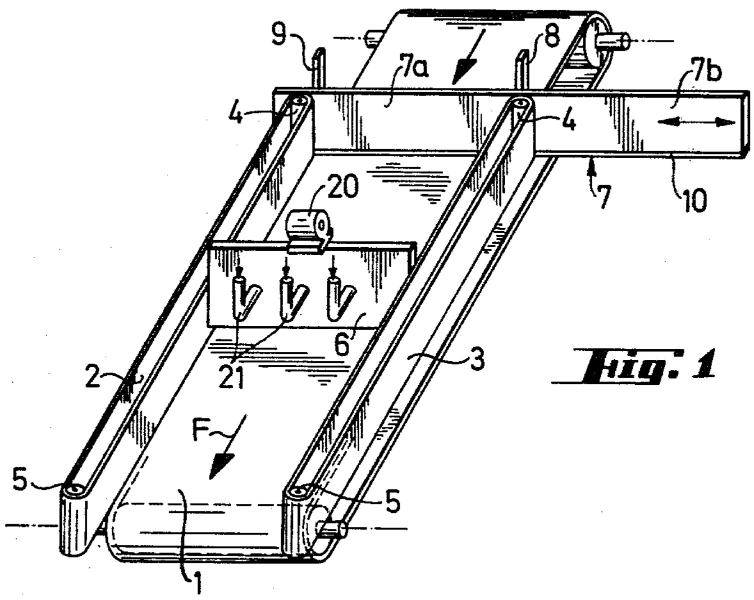
FIG. 1: A pouring head with grooved rear plate.

FIG. 1 shows an installation basically for pouring a mixture of plaster and water. The mixture may include other substances such as setting accelerators or retarders, fillers, surfactants, thinners, resins, foaming agents, reinforcing elements such as cut fibers, etc., of which no further mention shall be made. The mixture shall be referred to only as a mixture of plaster and water, although it may very well contain those substances of which a partial list has been given above. The pouring facility includes horizontal pouring conveyor 1 moving transversely in the direction of arrow F, two lateral bands 2 and 3, each turning around two rollers 4 and 5, forming the vertical sides of the conveyor, one front wall 6 in the form of a vertical plate at right angle to the direction of movement of conveyor 1 and a rear plate 7 parallel to the front plate 6 and bearing against side bands 2 and 3. In accordance with the invention, the rear plate 7 consists of at least two sections 7a and 7b, arranged side by side, either able to form the rear wall of the pouring reservoir. This rear plate 7 is installed between two vertical slides 8 and 9. Periodically, plate 7 is slipped within its slides in such a way as to take the section closing the reservoir out of service, for example section 7a, and replace it with section 7b. Section 7a is then cleaned and is ready to be put back into service in place of section 7b.

Figure 2:
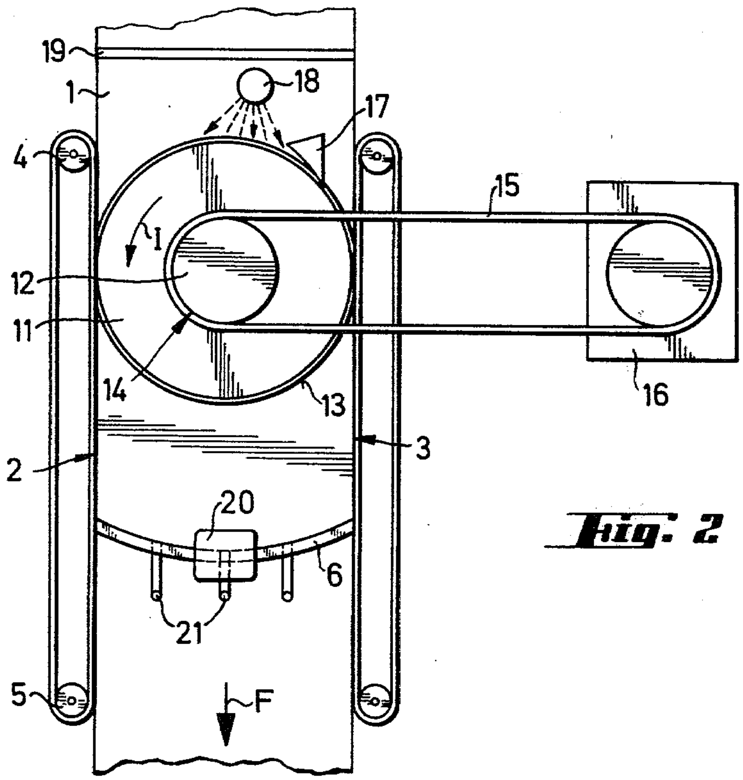
FIG. 2: A top view of one of the variants of pouring head in accordance with the invention.

It is an advantage if the slide gates are high enough to allow adjustment of the height of plate 7. Plate 7 may have its lower edge covered with a flange, or may carry a curved flap, directed towards the outside of the reservoir, for guiding the insertion of a reinforcement into the product being manufactured. FIG. 2 shows a pouring head of the same type except that the rear wall of the reservoir consists of a cylindrical drum or cylinder 11 with a vertical axis 12, and with a diameter equal to the width of conveyor 1. The cylinder 11 is in contact with lateral bands 2 and 3 which are diametrically opposite and drum 11 is provided on its lower face with a seal 13 that guarantees a proper sealing against the conveyor 1. The axis 12 of the cylinder 11 is equipped with a pinion 14 connected by a chain 15 to a rotary drive motor 16. Devices for cleaning the surface of the cylinder 11 such as a scraper 17 and/or a water spray nozzle 18 clean the cylinder of plaster deposits. Preferably, these devices are placed to act upon the part of the cylinder moistened by the plaster which has just issued from the reservoir, that is to say, near the right side when the cylinder turns in the direction of arrow I. The axis 12 of this cylinder 11 is placed inside and at the end of the conveyor in such a way that the front of the cylinder, which acts as the rear wall of the pouring reservoir, rests on conveyor 1. Conveniently, this cylinder is suspended from its shaft and it may be located entirely above the conveyor. In addition, this convenient layout allows the insertion of a reinforcement into the product near the lower surface, forcing it to arrive under drum 11.

To this effect, as stated in our French patent application No. 7803475, U.S. patent application Ser. No. 3,414, filed Jan. 15, 1979, previously mentioned, an independent device 19 for inserting reinforcements, in the form of a small, horizontal and transversal bar 19 or a curved screen, is placed at the rear of drum 11. As also stated in said French patent application, the front plate 6 is topped by a vibrator 20 and perforated by mixture feed nozzles 21. With this type of drum, since the reinforcement must be placed within the thickness of the product, that is to say anywhere except in the immediate proximity of the lower face, it would be preferable to insert it either inside the reservoir or on the downstream side of the reservoir. As shown in FIG. 2, the front wall 6 of the pouring reservoir may be curved inwardly at the edges so that the energy per unit of volume of the mixture contained in said reservoir and contributed by the streams through the feed nozzles 21, is essentially the same in the center and near the side edges of the reservoir. One could achieve also the same energy equilibrium without bending the front wall 6 inwardly by leaving it flat and increasing the diameter or the number of feed nozzles 21 near the sides of said plate. In one embodiment of the invention, shown in FIG. 3, the drum 11 rests against the ends of the lateral bands 2 and 3 and has a much larger diameter, thus resulting in a reservoir with a practically rectangular surface, better stirred by the feed streams than the preceding reservoir of FIG. 2 with two pointed corners on the sides of the drum side.

Figure 3:
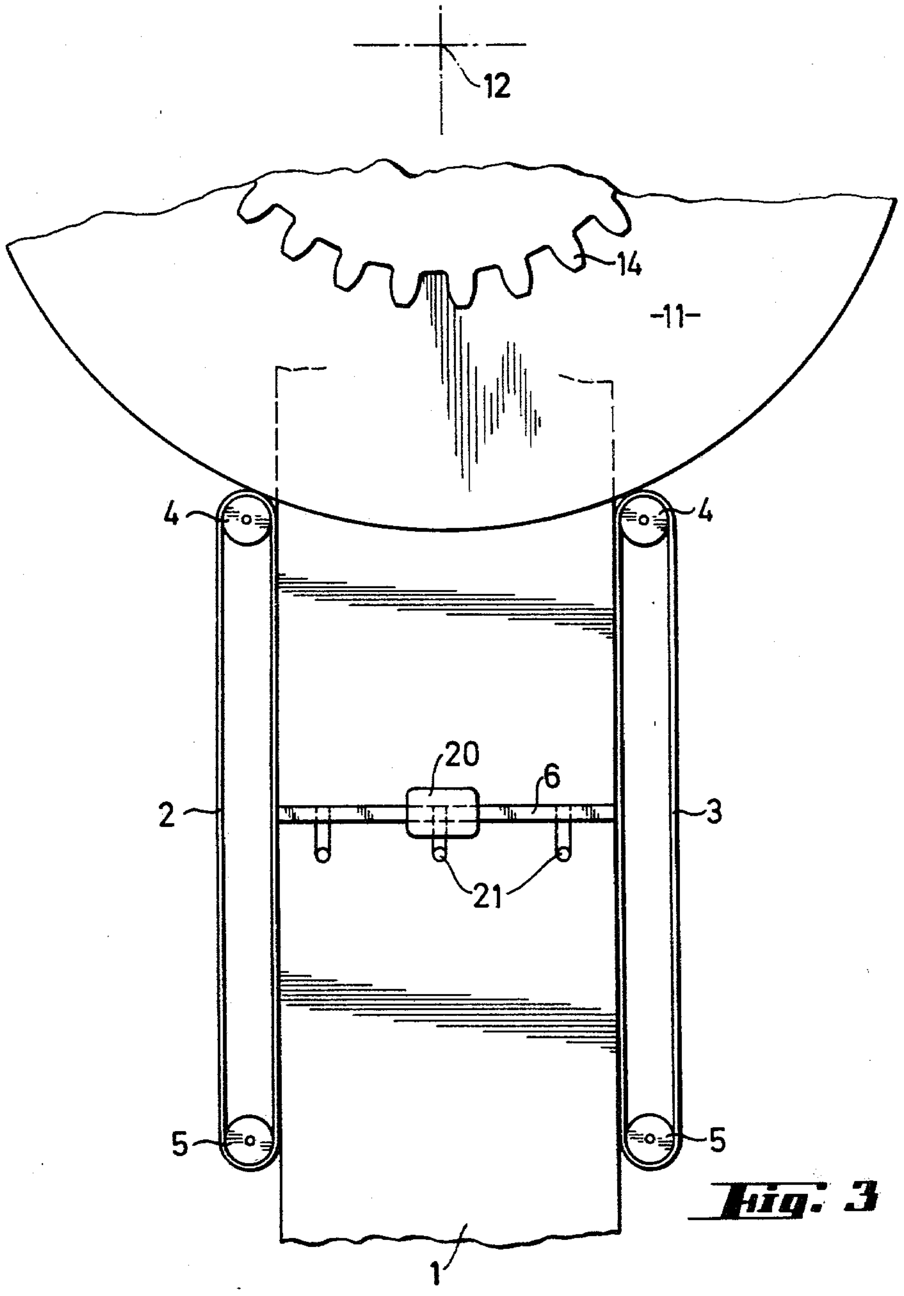
FIG. 3: A top view of a second embodiment in accordance with the invention.

In these two embodiments of the invention of FIGS. 2 and 3, the drums have a height practically equal to the height of the front plate, and at least adequate height to retain the mixture without overflowing. These cylinders are mounted on slide bases which allow adjustment of their distance in relation to the front plate. They are located at such distance from the front plate that any adjustments made in the case of a fixed and flat rear plate do not require modification. The description of these adjustments will be given further on.

In both embodiments, the cylinder is maintained in either continuous or intermittent rotation at such a speed that a point of its surface in contact with the mixture of plaster at one given instant leaves the reservoir and is cleaned by cleaning devices 17 and 18 before the plaster which sticks to it has had the time to set, this time being approximately 2 minutes for a plaster without setting modifiers.

Figure 4:
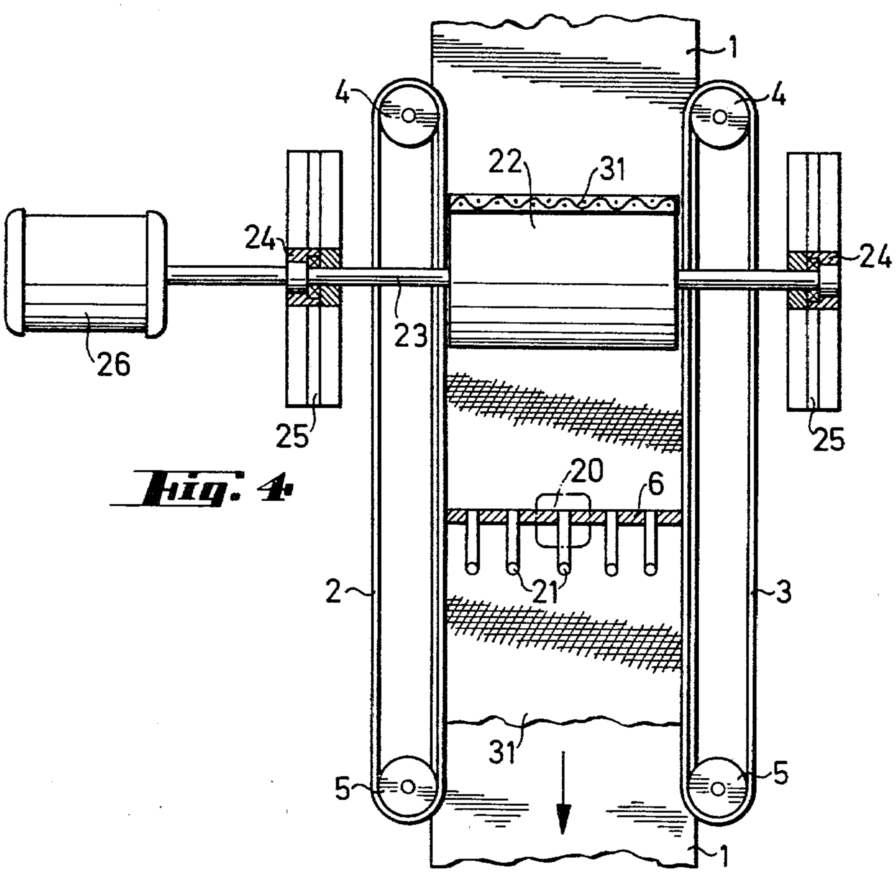
FIG. 4: A top view of a preferred form of implementing a pouring head in accordance with the invention.
Figure 5:
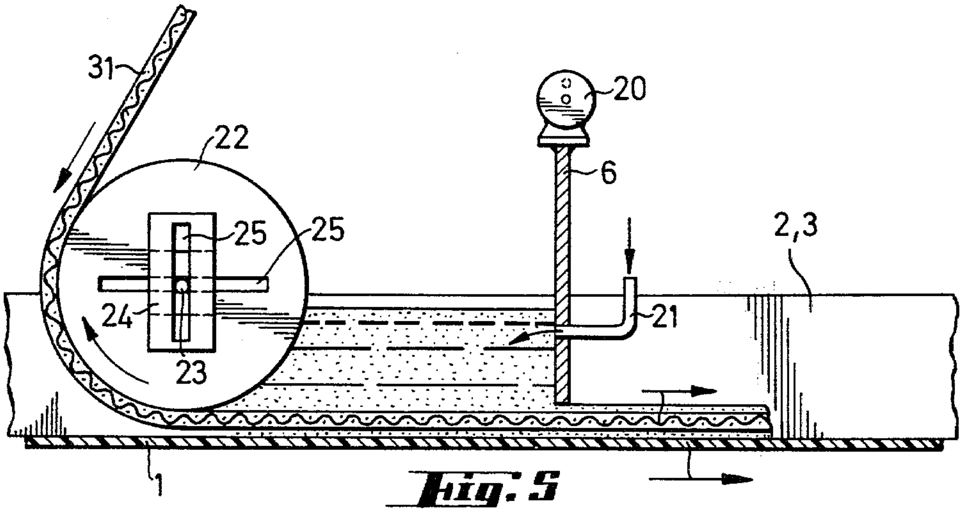
FIG. 5: A side view of the pouring head shown on FIG. 4.
Figure 6:
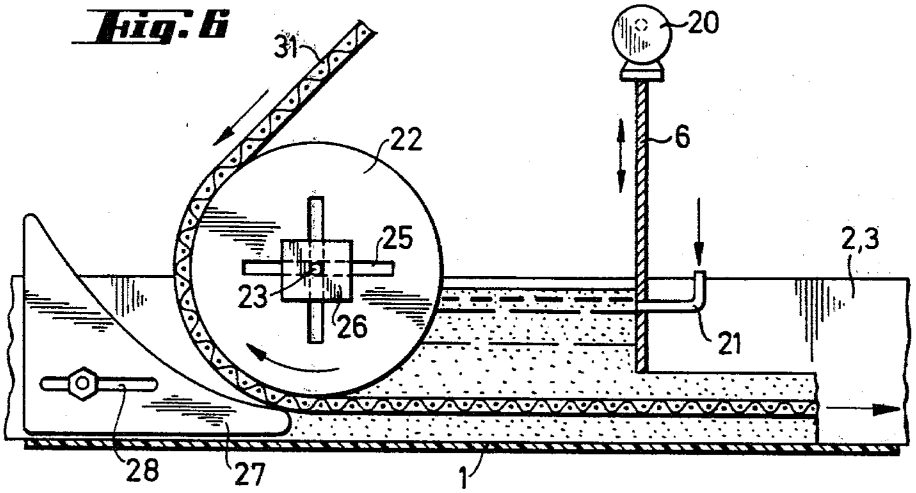
FIG. 6: A form of sealing usable with the pouring head of FIGS. 4 and 5.

In a more preferred version of the invention, shown in FIGS. 4 to 6, the curved surface of which the rear wall of the pouring reservoir is a part, is a cylindrical roller 22 having a horizontal shaft 23 with a length equal to the distance between the lateral bands 2 and 3 so that a seal between said bands and the cylinder is achieved. The shaft of the cylinder rotates on bearings 24 installed on double guides, one horizontal and the other vertical, so as to permit the adjustment of the height as well as adjustment of the distance relative to the front plate. The shaft of this roller 22 is connected with a motor 26 able to maintain it in rotation.

Besides, as shown in FIG. 6, a sealing piece 27 having approximately the form of a prism with a concave upper surface, may be added and slipped to the rear of the roller 22. This sealing piece 27 is mounted on horizontal slides 28 which allow it to be correctly positioned. Roller 22 has a diameter large enough for its shaft to pass above the lateral bands 2 and 3 in such a way that it is driven and supported by motor 26. A diameter of approximately 30 cm. is normal. The roller may be made of iron, steel, plastic, etc., preferably of a hard and low porosity material.

Figure 7:
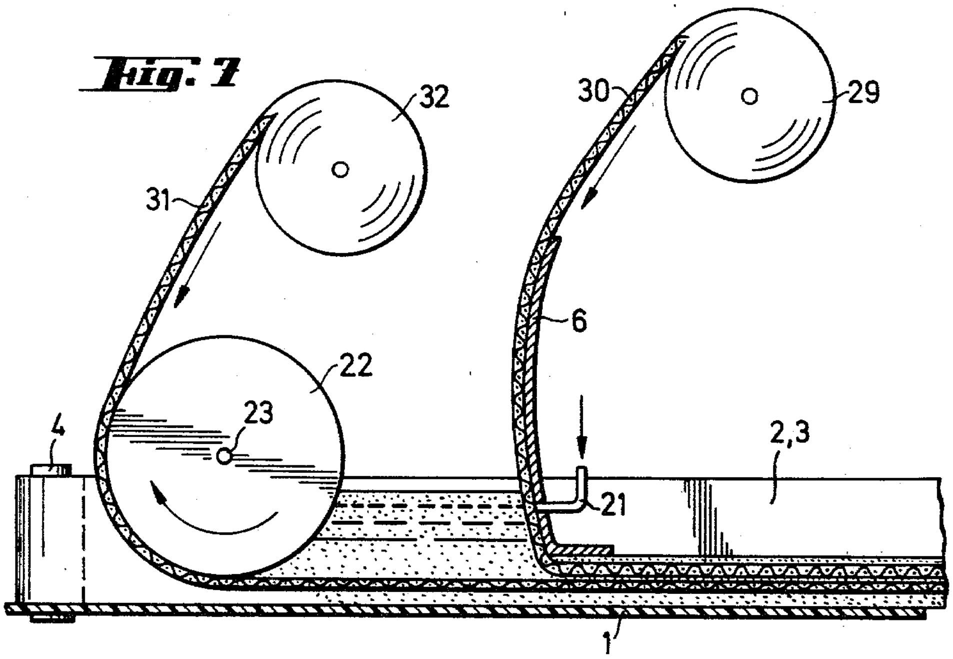
FIG. 7: A side view of a front plate
Figure 8:
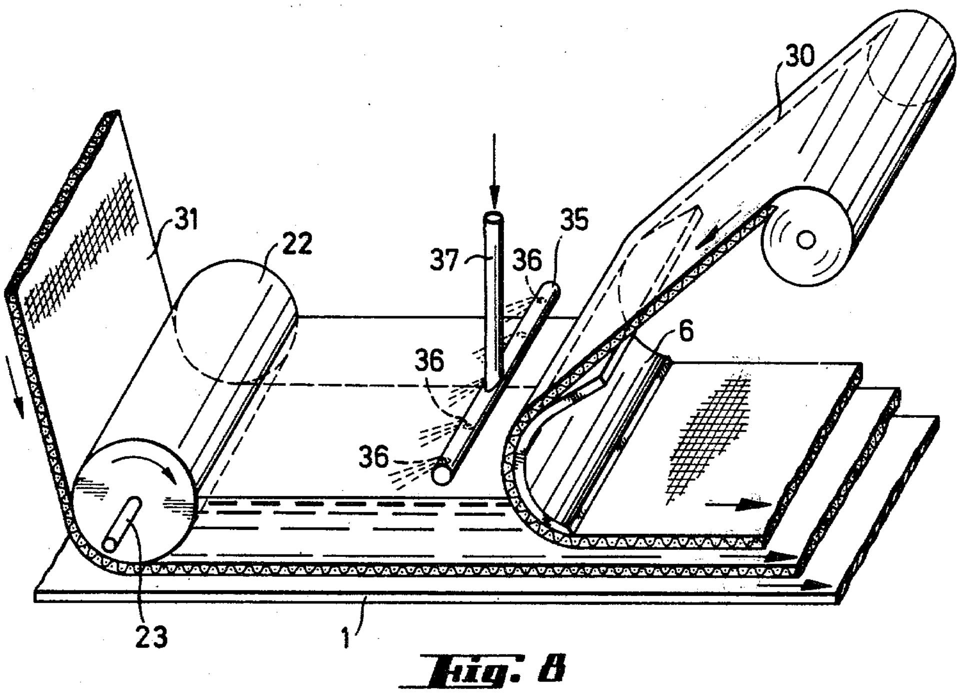
FIG. 8: An independent feed distributor ramp.

As shown in FIG. 7, one may give the front plate a curved shape with an axis of curvature or generating lines horizontal and perpendicular to the direction of movement of the conveyor. This curved form of the front plate may be used with all the variants of rear wall: a flat wall, a drum wall with vertical axis, and a roller type wall with a horizontal axis. In this last case, the storage reel 29 of reinforcement 30 which is introduced into the reservoir is arranged in such a way that said reinforcement 30 rubs over the surface of said front plate 6, that is to say in front of the front plate or at least perpendicular to it. Conveniently, when the reinforcement 30 is too thick and risks interfering with the feeding of the mixture and thus impeding the agitation in the trough, it is preferable to feed said trough through a distributor 35, detached from front plate 6, FIG. 8. This distributor 35 consists of a pipe of the same length as the width of the pouring head, provided with a series of orifices 36, connected in the middle of its length through a pipe 37 with the sources of production of the mixture of plaster and water. This distributor is arranged between the two front and rear plates of the trough, parallel to said plates and as close as possible to the front plate, either submerged in the mixture so that the streams of mixture that it delivers through orifices 36 are as submerged as the streams delivered by nozzles 21 through the front plate in the other embodiments of the invention, or placed immediately below the open surface of the liquid with orifices 36 slightly inclined downwardly in such a way that the jets penetrate immediately into the mixture and produce the required agitation. The number of orifices 36 is equal to the number of feed nozzles 21 which pass through the front plate in the other inventive embodiments. To assure that the energy of all the streams issuing from the distributor is identical, the diameter of the orifices increases from the center of the distributor towards its ends. In order to control a pouring head like the one shown in FIGS. 4 to 8, the following procedure is applied. To begin, one adjusts the height of roller 22 in relation to conveyor 1 through adjustment of the positions of bearings 24 on vertical slides 25. The lower guiding surface of the roller must be at a distance above the conveyor equal to the height at which one desires to place the reinforcement of the product.

In order to adjust the distance between the rear drum 11 or rear roller 22 and front plate 6, one proceeds as if one was handling a flat and fixed rear plate. In other words, once the feed rate of mixture for the production of plate products of a given thickness is set to the selected conveyor speed, the number of feed nozzles capable of producing agitation throughout the whole width of the pouring head and the diameter of the upstream feed tubes and nozzles are determined to insure that the flow speed of the mixture is a rate preventing the formation of deposits, i.e., greater than 10 cm/s. A pouring slit is made under front plate 6, the distance between front plate and rear roller or drum is adjusted in order to maintain a stable level of mixture in the pouring reservoir and the submerged feed streams. The distances between the front plate and the axis of the roller are frequently in the order of 10 cm. Then the reinforcements are inserted and the reinforcement container reels are arranged so that the reinforcements wipe well the surfaces which they are supposed to clean. Thus, a reinforcement 31 is guided under roller 22 and then under front plate 6. The reinforcement carried along by the power stretches. Storage reel 32 of reinforcement 31 is placed so that reinforcement 31 wraps at least ¼ and preferably ⅓ of rear roller 22. Thus, with storage reel 32 set as far back as possible, reinforcement 31 descends vertically to make contact with roller 22. If rear roller 22 is raised from the conveyor and a leak of mixture occurs, one may move sealing piece 27 forward under roller 22 in order to stop that leak. With a roller 22, 30 cm. in diameter, spaced 6 mm. from the conveyor surface, and under which passes a mat of tangled fibers, 2.5 mm. thick when free, at a conveyor speed of 1.50 to 3.0 m/min, leaks do not occur. A leak does not occur even if one increases the size of the gap by 1 or 2 mm.

Following this, the rotating speed of roller 22 or of drum 11 is adjusted. Any point of the roller shall not remain in the plaster or covered by plaster without being cleaned for more than 2 minutes, which corresponds to the time required for the plaster to begin to set. Thus, for a rear roller of 30 cm. diameter and a height of mixture of about 15 mm. within the reservoir, a peripheral speed ranging from 1 cm/min. and 10 cm/min. appears convenient and a speed in the order of magnitude of 3 cm. currently is chosen. The rotational speed should not be too high in order not to disturb the pouring. If the rotation is sequential, rotations should be made at intervals of approximately one minute, under the condition that the already mentioned limitations are respected.

Following this, and in the same manner, if one wishes to insert an additional reinforcement 30 on the inside of the reservoir between the front plate and the rear roller or drum, when the front plate is curved, and the reinforcement extended from its storage reel 29 is made to rub over the total surface of the front plate in contact with the mixture.

To the extent that for the reinforcement of the plaster, a continuous mat of tangled fiberglass, enclosed within two layers of fiberglass mesh, is used (0.5 mm, for example), one of the fiberglass mesh layers should be chosen for placing it in contact with the curved front plate. Thus, on account of the large size of the mesh, the feed through nozzles 21 and the agitation inside the agitation is not disturbed. On the other hand, if the mesh is made up of a "square" pattern of threads molded to each other, with all the warp threads on one side of the center plane of the mesh, and all the threads of the weft entirely on the other side of that same plane, one should choose to put in contact with the curved front wall the one with the threads most at right angles to the direction of unrolling of the mesh in question or, in other words, the most parallel to the plane of the conveyor, in order to favor the cleaning of that wall.

To the extent that the reinforcement inserted in contact with the front plate becomes too thick and the risk of interference with the feeding and agitation arises, it is preferable to use a feeding distributor 35, independent of the front plate. If the distributor is immersed, it may need light cleaning every 2 to 3 hours of operation. If it is not immersed, it would evidently not get dirty. With such a distributor, the determination of the flow rates and orifice sizes are made in the same manner as if they were feed tubes 21 passing through the front plate.

These pouring devices have been described using as an example a mixture based on plaster but they may also be used to pour other evolutive products besides the plaster and, it follows, also less evolutive or non-evolutive products.

We claim:

1. Apparatus for casting a plaster composition onto a moving base including a bottomless reservoir disposed above said moving base, said apparatus having a slit between said base and a front wall of said reservoir.

a movable rear wall of said reservoir being disposed with a surface thereof substantially vertical to said base and said rear wall being formed of but a single member having a larger surface at least twice that of an end of said reservoir, and said member being mounted such that said surface can be traversed across the width of said reservoir.

2. Device according to claim 1, characterized in that said larger surface is a plate having at least the size of two rear reservoir walls placed end to end, said plate bearing against the side walls of the reservoir and installing sliding-door like, in contact with said reservoir in such a way that by sliding the portion of the plate facing the reservoir which plays the role of rear wall, it can be taken out of service, and simultaneously replaced by that portion of the plate to which it is juxtaposed.

3. A device according to claim 1, characterized in that the larger surface is the lateral surface of a cylinder in contact with the side walls of a pouring reservoir.

4. A device according to claim 3, characterized in that the cylinder has a vertical axis and its lateral surface contacts the side walls of the reservoir.

5. A device according to claim 4, characterized in that the diameter of the cylinder is equal to the width of said reservoir.

6. A device, according to claim 4, characterized in that the diameter of the cylinder is larger than the width of said reservoir.

7. Apparatus for casting a plaster composition onto a moving base including a bottomless reservoir for containing a mixture disposed above said moving base and having a front wall operatively connected to a rear wall by a pair of sidewalls, said apparatus having a slit between said base and said front wall of said reservoir, means for introducing a reinforcement intended for reinforcing the manufactured product, so that the reinforcement bears on the lower edge of said front wall and rubs over its surface, and feed distributor means for feeding fresh mixture into said reservoir, said feed distributor means being positioned inside said reservoir and transversely in relation to the movement of said base, and having mixture discharge orifices pointing toward said rear wall of said reservoir.

8. A device, according to claim 7, characterized in that the distributor is placed at such height in relation to the base that the streams delivered by its are immersed within the mass of the mixture already contained in the reservoir.

9. A device, according to claim 7, characterized in that the distributor has a height in relation to the base such that it is above the open surface of the mixture contained in the reservoir.

10. A device, according to claim 9, characterized in that the discharge orifices of the mixture are slightly inclined towards the bottom, so that the streams of mixture delivered penetrate immediately into the mixture already contained in the reservoir.

11. Apparatus for casting a plaster composition onto a moving base including a bottomless reservoir for containing a mixture disposed above said moving base and having a front wall operatively connected to a rear wall surface portion by a pair of sidewalls said apparatus having a slit between said base and front wall of said reservoir, means for feeding fresh mixture into said mixture in said reservoir and for directing the fresh mixture against said rear wall, and rear wall surface means for presenting the first said rear wall surface portion to the reservoir and also for presenting a different rear wall surface portion to the reservoir, said means being larger than the first said surface portion and being movable to remove the first said surface portion from the mixture and present the different surface portion to the mixture without interrupting the casting.

12. A device according to claim 11, characterized in that said rear wall surface means in the lateral surface of a cylinder in contact with the sidewalls of the reservoir, and the cylinder has a horizontal axis perpendicular to the direction of movement of said base, said cylinder being in contact with the sidewalls of the reservoir.

13. A device according to claim 12, characterized in that a reinforcement intended to reinforce the manufactured product is arranged over the full width of the base, in contact with a portion of the cylinder surface which is outside the reservoir.

14. A device according to claim 13, characterized in that the reinforcement is wrapped around at least $\frac{1}{4}$ of the cylinder.

15. A device according to any one of claims 12 through 14, characterized in that the cylinder is installed and is rotatable on bearings, and is adjustable horizontally and vertically by means of two slide bases.

16. A device according to any one of claims 12 through 14, characterized in that one sealing piece in the form of a prism with a concave upper surface may be slipped to the rear of and under the cylinder to prevent leaks of mixture.

17. A device according to any one of claims 12 through 14, characterized in that motor means is connected to the surface to which the rear wall of the reservoir belongs, and drives same for movement.

18. A device, according to claim 17, characterized in that the motor means is a motor driving the surface according to one of the following manners: continuous or sequential.

* * * * *